(No Model.)
M. STERN & G. ROTHGIESSER.
PNEUMATIC TIRE.
No. 560,376.  Patented May 19, 1896.
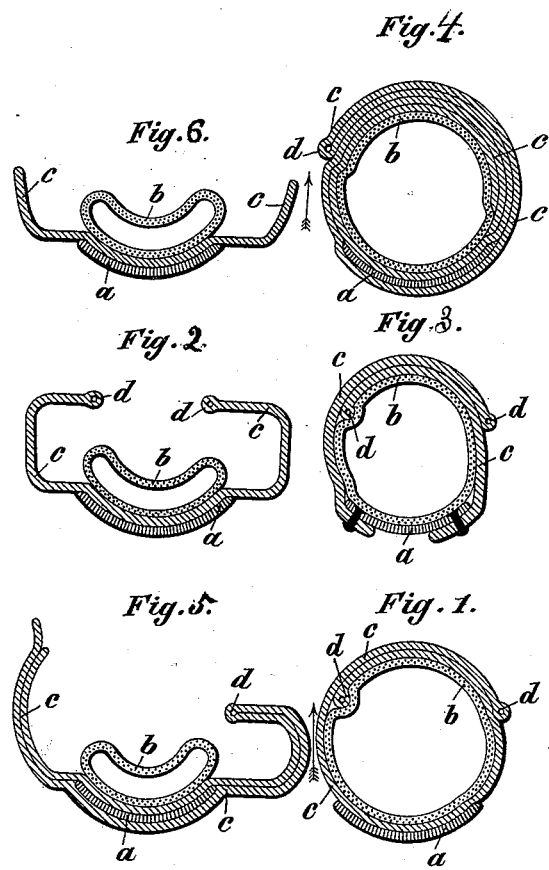
Witnesses:
Jesse Kingsbery.
D. A. Vanderschmidt.
Inventors:
Max Stern
Georg Rothgiesser
By Whitaker Prevost, Attys.

UNITED STATES PATENT OFFICE.

MAX STERN AND GEORG ROTHGIESSER, OF DÜSSELDORF, GERMANY.

PNEUMATIC TIRE.

SPECIFICATION forming part of Letters Patent No. 560,376, dated May 19, 1896.

Application filed December 11, 1893. Serial No. 493,384. (No model.) Patented in Germany July 14, 1893, No. 69,751, and in Switzerland September 2, 1893, No. 7,383.

*To all whom it may concern:*

Be it known that we, MAX STERN and GEORG ROTHGIESSER, of Düsseldorf, in the Empire of Germany, have invented a new and useful Improvement in and Relating to Pneumatic Tires, (for which Letters Patent have been granted in Germany, No. 69,751, dated July 14, 1893, and in Switzerland, No. 7,383, dated September 2, 1893,) of which the following is a specification, reference being had therein to the accompanying drawings.

Our invention relates to an improved construction of cover or jacket for pneumatic tires; and it consists, essentially, of an annular strip of suitable material having inextensible bands or hoops in its edges adapted to be placed on or attached to the wheel-rim at about the center of its width and to have its edges folded over the air-tube so that the said edges overlap one another, the object being to facilitate the gaining of access to the air-tube for the purpose of inspection or repair and to attach or secure the tire to the wheel-rim in a ready and simple manner. We attain this end in the manner shown by the accompanying drawings, in which—

Figure 1 is a view in transverse section of our improved tire, and Fig. 2 is a similar view showing the cover thereof unfolded or open to expose the air-tube. Fig. 3 is a view in transverse section, showing a modification in the construction of our improved tire. Figs. 4 and 5 are views in transverse section of another form our improved tire may assume, Fig. 4 showing the tire ready for use and Fig. 5 showing the cover unfolded or open to expose the air-tube. Fig. 6 is a view in transverse section, showing another form our invention may assume.

Throughout the views, $a$ designates the wheel-rim; $b$, the air-tube; $c$, the cover, and $d$ the restraining bands or hoops in the edges of the cover.

The cover $c$ of the tire consists of an annular strip of rubber reinforced with canvas by any of the well-known methods. This annular strip has pockets formed in its edges, in which are placed the restraining bands or hoops $d$, which may be made of wire or any other suitable inextensible material. The cover $c$ is preferably solutioned at or about the center of its width to the wheel-rim $a$; but this is not obligatory, as when the tire is inflated it will securely fix itself to the wheel-rim, owing to its peculiar construction; but we prefer to solution or otherwise fix it to the wheel-rim, as it thereby becomes located thereon and is not liable to become displaced when folding or unfolding it to inclose or expose the air-tube $b$.

As a modification, instead of making the cover $c$ in one strip it may be made in two strips, each of which is fixed to the wheel-rim by any suitable device—such as screws, rivets, &c.—as shown by Fig. 3.

To make up the cover and inclose the air-tube, one of the edges of the cover is first placed over the air-tube and then the other edge of the cover is folded over the said edge. On the inflation of the air-tube the two overlapping edges of the cover become securely fixed the one to the other, owing to the restraining influence of the two inextensible bands or hoops $d$, which being of a fixed diameter cannot move in a radial direction away from the periphery of the wheel-rim, so that the greater the pressure of air in the tire the more firmly are the overlapping edges of the cover pressed against each other.

In the modification shown by Figs. 4, 5, and 6 only one edge of the cover $c$ is fitted with a band or hoop $d$, in which case the edge of the cover having no restraining band or hoop is first folded over the air-tube, so that the edge having the restraining band or hoop is outside, the cover being of such a width that there is sufficient frictional contact between the overlapping edges of the cover to prevent them becoming disengaged. In this construction of tire we prefer to form the cover $c$ of a double thickness, as shown by Figs. 4 and 5, so that one thickness may be passed around outside the wheel-rim; but we do not limit ourselves to the use of this double cover, as a single one may be used, as shown by Fig. 6.

It will be seen that the air-tube can be readily exposed as soon as the tire has been deflated by unfolding or spreading apart the sides of the cover, as shown by Figs. 2, 5, and 6.

It will be understood that the size and shape of the tire is entirely governed by the difference between the diameter of the wheel-rim and that of the inextensible band or hoop or bands or hoops, as the case may be.

We wish it to be particularly understood that we do not limit ourselves to the precise details of construction hereinbefore described and illustrated by the accompanying drawings, but we hold ourselves at liberty to make such changes and alterations as fairly fall within the spirit and scope of our invention.

What we claim, and desire to secure by Letters Patent of the United States, is—

1. A cover for a pneumatic tire consisting of an annular strip of any suitable fabric having an inextensible band or hoop located in or attached to one or both of its edges the said edges being adapted to lie over one another on the outer face or tread of the tire and become locked to each other when the tire is inflated, substantially as described.

2. A cover for a pneumatic tire consisting of an annular strip adapted to be seated on the wheel-rim at or about the center of its width and having an inextensible band or hoop in one or both of its edges, the said edges being adapted to fold over one another to inclose the air-tube, substantially as described.

3. In a pneumatic tire, the combination with a wheel-rim $a$ and an air-tube $b$, of a cover such as $c$ consisting of an annular strip having an inextensible band or hoop such as $d$ at each edge, the said cover being seated on or attached to the wheel-rim at or about the center of its width, the edges of the cover being adapted to fold the one over the other to inclose the air-tube, substantially as described.

4. In a pneumatic tire, the combination with a wheel-rim $a$ and an air-tube $b$, of a cover such as $c$ having an inextensible band or hoop such as $d$ in one of its edges the said cover being seated on or attached to the wheel-rim at or about the center of its width, the edges of the cover being folded one over the other to inclose the air-tube the edge having the inextensible band or hoop being outside, substantially as described.

5. In a pneumatic tire, the combination with a wheel-rim such as $a$ and an air-tube such as $b$, of a cover $c$ consisting of two annular strips each having one of its edges connected or fixed to the wheel-rim $a$ and having an inextensible band or hoop such as $d$ in the free edge of one or both of the said strips, substantially as described.

In witness whereof we have hereunto set our hands in presence of two witnesses.

MAX STERN. [L. S.]
GEORG ROTHGIESSER. [L. S.]

Witnesses:
PETER LIEBER,
WILHELM OTTO.